E. OWEN.
MEANS FOR SECURING PNEUMATIC AND OTHER TIRES TO THE RIMS OF WHEELS.
APPLICATION FILED APR. 1, 1910.
981,792. Patented Jan. 17, 1911.
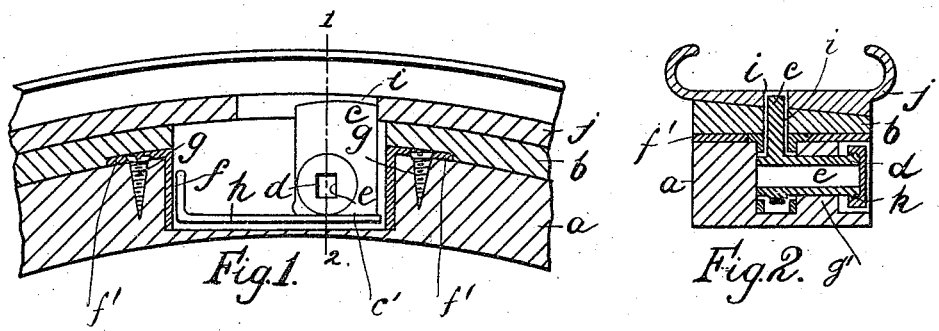
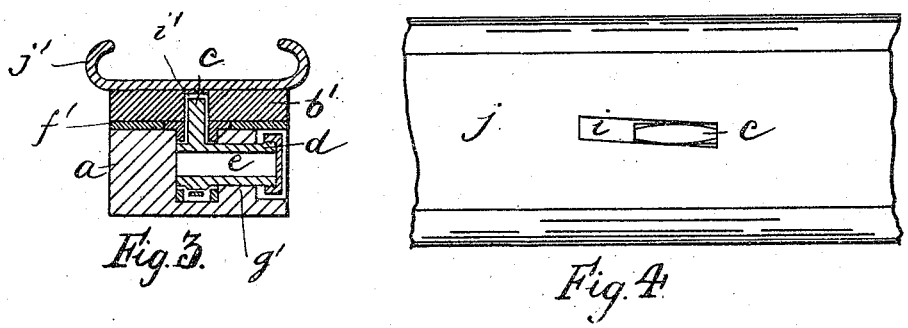
Witnesses:
E. B. Corcoran
James McLean
Inventor
Edward Owen.
by Herbert W. Jenner.
Attorney

UNITED STATES PATENT OFFICE.

EDWARD OWEN, OF LLANDUDNO, ENGLAND.

MEANS FOR SECURING PNEUMATIC AND OTHER TIRES TO THE RIMS OF WHEELS.

981,792.

Specification of Letters Patent.   Patented Jan. 17, 1911.

Application filed April 1, 1910.   Serial No. 552,780.

*To all whom it may concern:*

Be it known that I, EDWARD OWEN, subject of the King of Great Britain and Ireland, and resident of Llandudno, in the county of Carnarvon, England, joiner and builder, have invented certain new and useful Improvements in Means for Securing Pneumatic and other Tires to the Rims of Wheels, of which the following is a specification.

My invention relates to improvements in means for enabling pneumatic and other tires to be secured to the wheels of road vehicles and has reference to that class of device consisting of a fixed rim on the wheel having a conical surface or a solid wheel provided with a conical periphery and a detachable rim carrying the tire having an internal conical surface corresponding to that of the rim or wheel so that the one may be easily applied to or be removed from the other the object of my invention being to provide improved means for securing the detachable rim to the fixed rim or wheel. Or rims having a parallel joint connection may be employed.

This invention consists in the novel construction and combination of the parts hereinafter fully described and claimed.

My invention will be fully described with reference to the accompanying drawings in which, Figure 1 a sectional elevation of so much of a wheel and rims as are necessary to illustrate my invention, Fig. 2 transverse section of same on line 1—2 of Fig. 1, Fig. 3 similar section of a modified arrangement showing the invention applied to wheels having parallel rims and, Fig. 4 plan of Fig. 1.

The felly of the wheel is provided with a series of fastening devices, preferably four, arranged at suitable distances apart, and as they are all alike, the description will be confined to one of them. A socket $f$ is provided with flanges $f'$ at its top, and is secured by screws $g$ in a recess in the felly $a$. A spindle $d$ having a rectangular hole $e$ is journaled in the socket $f$ and in a bearing $g'$ formed in the felly. The hole $e$ is adapted to be engaged by a suitable key, and the outer end of the spindle is provided with a removable cap $k$.

The spindle $d$ is provided with a projection or tongue $c$ which when turned upward engages with slots $i$ in the wheel rim $j$ and in a ring $b$ which is arranged around the felly over the socket. The rim $j$ and the ring $b$ are preferably provided with conical faces, and the slots $i$ are preferably inclined to the plane of the wheel, as shown in Fig. 4, so that the tongue $c$ may operate to press the parts $j$ and $b$ into frictional engagement with each other.

A spring $h$ is secured in the socket at one end, and its free end portion bears against a flat portion $c'$ on the tongue, so that the spring holds the tongue turned up or down in its extreme positions, and prevents it from being moved accidentally. When the tongue is turned down out of engagement with the slots $i$, the rim $j$ can be slid laterally out of engagement with the ring $b$ and the felly.

In the modification shown in Fig. 3, the rim $j'$ is secured to the ring $b'$, and the ring $b'$ has a groove $i'$ which corresponds with the slot $i$ previously described herein.

What I claim is:

The combination, with a wheel felly provided with a recess, of a socket secured in the said recess, a ring encircling the felly, a wheel rim encircling the said ring, said ring and rim having conical faces and slots arranged at an angle to the plane of the wheel, a spindle journaled in the said socket and provided with a locking-tongue which engages with the said slots and which is adapted to move the rim laterally upon the ring, and means for holding the locking-tongue in engagement with the slots.

In testimony whereof I have hereunto set my hand in the presence of two witnesses.

EDWARD OWEN.

Witnesses:
  AMY E. EVINS,
  WILLIAM H. TAYLOR.